(12) United States Patent
Slaghek et al.

(10) Patent No.: US 7,862,684 B2
(45) Date of Patent: Jan. 4, 2011

(54) USE OF PARTICULATE MATERIAL DERIVED FROM MAMMALIAN HAIR IN THE PREPARATION OF PAPER OR PAPERBOARD PRODUCTS

(75) Inventors: Theodoor M. Slaghek, Rotterdam (NL); Mario T. R. van Wandelen, Zeist (NL); Willem C. Drost, Zeist (NL); Dario M. R. Lo Cascio, Ouderkerk aan de Amstel (NL); Remco W. G. van Willige, Apeldoorn (NL); Willem Huijser, Rotterdam (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 292 days.

(21) Appl. No.: 10/589,869

(22) PCT Filed: Feb. 18, 2005

(86) PCT No.: PCT/NL2005/000118

§ 371 (c)(1),
(2), (4) Date: Dec. 14, 2006

(87) PCT Pub. No.: WO2005/080670

PCT Pub. Date: Sep. 1, 2005

(65) Prior Publication Data

US 2007/0158038 A1    Jul. 12, 2007

(30) Foreign Application Priority Data

Feb. 19, 2004   (EP)   .................................. 04075540

(51) Int. Cl.
*D01C 3/00*   (2006.01)
*D21F 13/00*   (2006.01)

(52) U.S. Cl. ........................... 162/2; 162/143; 162/151

(58) Field of Classification Search .................... 162/2, 162/143, 151; 8/127.5, 127.51
See application file for complete search history.

(56) References Cited

U.S. PATENT DOCUMENTS 1,331,609 A * 2/1920 Anders .......................... 8/111

(Continued)

FOREIGN PATENT DOCUMENTS

JP         03-174041 A  *  7/1991

(Continued)

OTHER PUBLICATIONS

Smook, Handbook for Pulp and Paper Technologists, 1992, Angus Wilde Publications, 2nd edition, p. 195-197, 205-206.*

(Continued)

*Primary Examiner*—Matthew J. Daniels
*Assistant Examiner*—Anthony J Calandra
(74) *Attorney, Agent, or Firm*—Nixon & Vanderhye P.C.

(57) ABSTRACT

The invention relates to the use of a particulate material derived from mammalian hair in the preparation of a paper or paperboard product, which particulate material has been prepared by means of a process, which comprises the following steps: (a) subjecting mammalian hair to an oxidation treatment in which the hair is contacted with a solution, which comprises a bleaching agent; (b) separating the oxidised hair from the solution; (c) drying the separated hair; and (d) subjecting the dried hair to a treatment in which the hair is formed into a particulate material having an average particle size in the range of from 0.5 to 4 mm. The invention further relates to a paper or paperboard product, or paper pulp comprising said particulate material.

14 Claims, 5 Drawing Sheets

U.S. PATENT DOCUMENTS

| | | | | |
|---|---|---|---|---|
| 1,937,710 | A * | 12/1933 | Muller | 8/111 |
| 3,207,613 | A | 9/1965 | Merrill et al. | |
| 5,707,491 | A | 1/1998 | Hughes et al. | |
| 5,810,970 | A | 9/1998 | Masterson et al. | |
| 6,120,556 | A * | 9/2000 | Nishino et al. | 8/111 |
| 6,120,644 | A | 9/2000 | Schroeder et al. | |
| 2002/0053110 | A1 * | 5/2002 | Dias et al. | 8/405 |

FOREIGN PATENT DOCUMENTS

| | | |
|---|---|---|
| JP | 2001-214400 A | 8/2001 |
| JP | 2002-194693 A | 7/2002 |
| WO | 99/13861 | 3/1999 |
| WO | WO 03/006531 A1 | 1/2003 |

OTHER PUBLICATIONS esp@cenet database, English Patent abstract for JP3174041A Akitaro et al.,1991, esp@cenet, whole abstract.*

Jim Clark, Strong and weak bases [downloaded online from www.chemguide.co.uk], 2002 [downloaded on Sep. 28, 2009].*

Smook, Handbook for Pulp and Paper Technologists, 1992, Angus Wilde Publications, 2nd edition, chapter 2.*

Human English Translation of JP03174041A, 1991.*

International Search Report for PCT/NL2005/000118 dated Jun. 30, 2005.

Patent Abstracts of Japan, vol. 0154, No. 21 (C-0878) Oct. 25, 1991 and JP 03 174041, Jul. 29, 1991.

Patent Abstracts of Japan, vol. 0185, No. 47 (C-1262) Oct. 19, 1994 and JP 06 192433, Jul. 12, 1994.

Patent Abstracts of Japan, vol. 2003, No. 12, Dec. 5, 2003 and JP 2003 238330, Aug. 27, 2003.

Patent Abstracts of Japan, vol. 018, No. 542 (C-1261) Oct. 17, 1994 and JP 06 191967, Jul. 12, 1994.

Patent Abstracts of Japan, vol. 008, No. 178 (C-238) Aug. 16, 1984 and JP 59 075971, Apr. 28, 1984.

* cited by examiner

USE OF PARTICULATE MATERIAL DERIVED FROM MAMMALIAN HAIR IN THE PREPARATION OF PAPER OR PAPERBOARD PRODUCTS

This application is the U.S. national phase of international application PCT/NL2005/000118 filed 18 Feb. 2005 which designated the U.S. and claims priority to EP 04075540.7 filed 19 Feb. 2004, the entire content of each of which is hereby incorporated by reference.

The present invention relates to the use of a particulate material derived from mammalian hair in the preparation of a paper or paperboard product, and a paper or paperboard product, or paper pulp comprising said particulate material.

Paper and paperboard products are made of paper pulp consisting of cellulose fibres derived from trees. Since the global demand for paper and paperboard products is strongly increasing, deforestation is rapidly accelerating, causing in turn major environmental problems. In order to deal with the problem of deforestation, in many countries measures have been taken to ensure that old paper is being recycled and used in the preparation of paper. However, paper has as such the drawback that it can only be recycled a limited number of times because its intrinsic and required properties deteriorate as a result of the recycling processes.

Object of the present invention is to provide a cheap and effective substitute for cellulose fibres, thus ensuring that much less cellulose fibres need to be used in the preparation of paper and paperboard products.

Surprisingly, it has now been found that a very cost-effective and efficient substitute can be prepared from mammalian hair.

Accordingly, the present invention relates to the use of a particulate material derived from mammalian hair in the preparation of a paper or paperboard product, which particulate material has been prepared by means of a process, which comprises the following steps:
(a) subjecting mammalian hair to an oxidation treatment in which the hair is contacted with a solution, which comprises a bleaching agent;
(b) separating the oxidised hair from the solution;
(c) drying the separated hair; and
(d) subjecting the dried hair to a treatment in which the hair is formed into a particulate material having an average particle size in the range of from 0.5 to 4 mm.

BRIEF DESCRIPTION OF THE DRAWINGS

The invention is further explained in the attached drawings in which.

Figure 1:
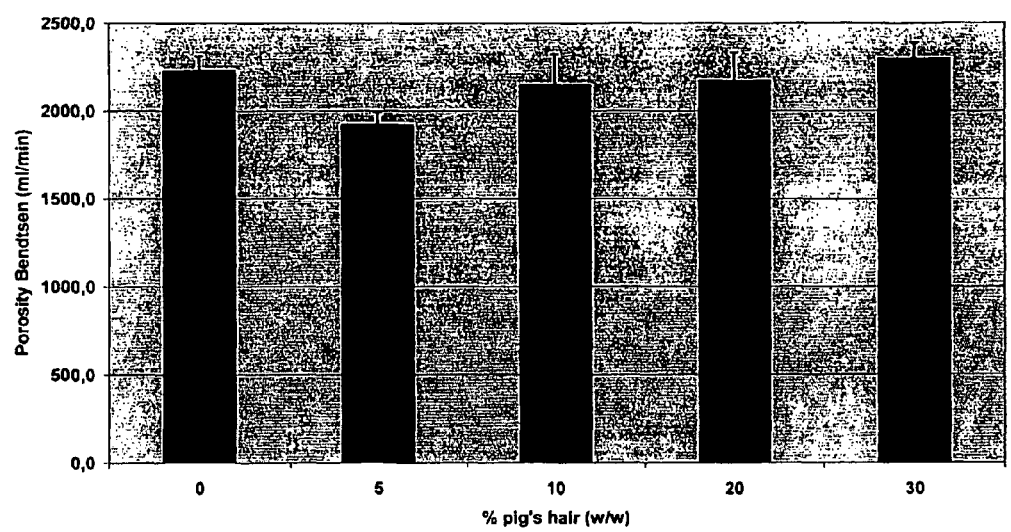
FIG. 1 is a graph showing the porosity of five samples prepared according the Examples.

The particulate material so obtained can very attractively be used as a substitute for cellulose fibres in the production of paper and paperboard products.

Although various types of mammalian hair can be used in the process of the present invention, the hair of livestock is being preferred, one reason being its readily availability due to today's large, worldwide meat consumption. Another reason is the stiffness of the hair of livestock in combination with excellent mixing properties. Especially, the hair of pigs can very attractively be used in accordance with the present invention.

One single type of mammalian hair can be used or a mixture of various different kinds of mammalian hair can be used. In practice preference will be given to the use of one type of mammalian hair.

According to the invention mammalian hair is subjected in step (a) to an oxidation treatment, which is carried out in a solution comprising a bleaching agent. The solution comprises a solution that has been made alkaline (above pH 7) or acidic (below pH 7). Preferably, the solution has been made alkaline by the addition of NaOH, KOH and/or $NH_4OH$ or acidic by the addition of one or more (organic) acid(S). A wide variety of (organic) acids can be used, including for instance acetic acid and formic acid.

The pH value of the alkaline solution to be used in step (a) is preferably in the range of from 9 to 11, more preferably in the range of from 10 to 11, and the pH value of the acidic solution is preferably in the range of 3 to 7, more preferably in the range of from 4 to 6.

Suitable bleaching agents include organic and inorganic peroxides. Preferably, use is made of a bleaching agent selected from the group of hypohalides, perborates, percarbonates, organic peroxides, or hydrogen peroxide. More preferably, the bleaching agent comprises hydrogen peroxide. One single bleaching or a mixture of different bleaching agents can suitably be applied in the alkaline or acidic solution. In the alkaline solution preferably one or more inorganic peroxides are used, whereas in the acidic solution preferably one or more organic peroxides are used. Suitably, the bleaching agent is used in an amount in the range of from 0.1% (w/w) to 40% (w/w), preferably in the range of from 0.3% (w/w) to 30% (w/w), based on total alkaline or acidic solution.

In step (a) the hair can suitably be contacted with the alkaline or acidic solution over a period of time in the range of from 5 minutes to 16 hours, preferably in the range of from 15 minutes to 10 hours. The temperature to be applied in step (a) is suitably in the range of from room temperature to 100° C., preferably in the range of from 30° C. to 80° C.

The hair to be oxidised in step (a) is preferably first subjected to a washing step in which soluble components, such as for instance blood, urine remnants and other animal components, are removed from the hair before the hair is subjected to step (a).

The oxidised hair obtained in step (a) is subsequently separated in step (b) from the alkaline or acidic solution by means of a known technique. For this purpose use can, for instance, be made of a conventional filtering system.

In step (c) the hair which has been separated in step (b) is dried. The drying of the hair can be established by known techniques. The hair can for instance be dried using hot air or washing with a volatile solvent such as ethanol.

In step (d) the dried hair is subjected to a treatment in which hair is formed into a particulate material having an average particle size in the range of from 0.5 to 4 mm. The particulate material can be made by grinding or refining the hair obtained in step (c). Preferably, the treatment in step (d) comprises a refining treatment in which a particulate material is obtained having an average particle size in the range of from 0.5 to 4 mm. Suitably, the refining treatment can be carried out by standard pulping and mill technology, known to the skilled person.

Preferably, the particulate material has an average particle size in the range of from 1-3 mm, more preferably in the range of from 1.5-2.5 mm. The particulate material preferably comprises fibres.

The particulate material obtained in accordance with the present invention is unique. The present invention therefore also relates to a particulate material prepared from mammalian hair and obtainable by the process according to the present invention.

The present invention further relates to a paper or paperboard product comprising the particulate material according to the present invention. Suitably, in such products the particulate material comprises fibres. The present invention also relates to paper pulp comprising the particulate material. Suitably, the particulate material is present in the form of fibres.

In the context of the present invention the term "paper product" is meant to include all sorts of papers, such as printing paper, tissue/hygiene, newspaper, office paper, specialities, as well as materials such as cardboard, folding board, box board, undulated board, and 3D board.

The fibres in accordance with the present invention can very attractively be used to substitute cellulose fibres in the preparation of paper products. In a particular embodiment of the present invention the present fibres are used together with old (recycled) paper to produce paper products or paperboard products. The paper or paperboard products in accordance with the present invention may advantageously comprise the fibres in accordance with the present invention in an amount in the range of from 0.1 to 60 weight %, based on total paper or paperboard product. Preferably, the paper or paperboard products in accordance with the present invention comprise the present fibres in an amount in the range of from 1 to 50 weight %, based on total paper or paperboard product. More preferably, in an amount in the range of from 3 to 45 weight %, based on total product.

EXAMPLES

Preparation of Hair Fibres

To a mixture of 250 grams of hair was added 9 liters of water and subsequently the pH of the mixture was brought to a level suitable for oxidation. Then the temperature of the mixture was raised to 65-70° C. and 140 ml of a 30% (w/w) solution of hydrogen peroxide (pH 11) or 30 ml of a 32% (w/w) of per acetic acid (pH 5) was added. The mixture was stirred for 16 hours after which the oxidised hair was isolated by filtration and dried at 70° C. After drying the hair was cut into small fibres with a fibre length between 0.5 and 4 mm using a PFI mill.

Evaluation of Oxidised Hair Fibres

The various samples of oxidised and processed hair fibres (samples of 5, 10, 20 and 30% (w/w)) were mixed with virgin cellulose fibres from eucalyptus in such a way that for each mixture a constant weight was obtained. Also sheets were made using only the virgin Eucalyptus cellulose fibre for comparison and evaluation results were depicted as 0%. The sheets were obtained by using a FRET (Formation and Retention Tester) and applying a vacuum of 0.5 bar. The sheets were dried at 100° C. using a Rapid Köthen drying cell. From each mixture three sheets were made.

From each mixture obtained the paper properties were determined.

Volume Per Mass ($cm^3$/gram):
The volume per mass was calculated by dividing the thickness of the sheet by weight per $m^2$. Table 1 gives the results of the different sheets.

TABLE 1

Volume per mass of sheets

| % Bleached hair (w/w) | Volume per mass ($cm^3$/g) |
|---|---|
| 0 | 1.52 |
| 5 | 1.58 |
| 10 | 1.64 |
| 20 | 1.66 |
| 30 | 1.83 |

From the results as depicted in Table 1 the conclusion can be drawn that the volume per mass increases with increased addition of oxidised and processed hair fibres.

Porosity:
The effect of the addition of oxidised hair fibres on porosity is depicted in FIG. 1. From FIG. 1 the conclusion can be drawn that the addition of oxidised and processed hair fibres does not have a large influence on the porosity of the formed sheets.

Figure 2:
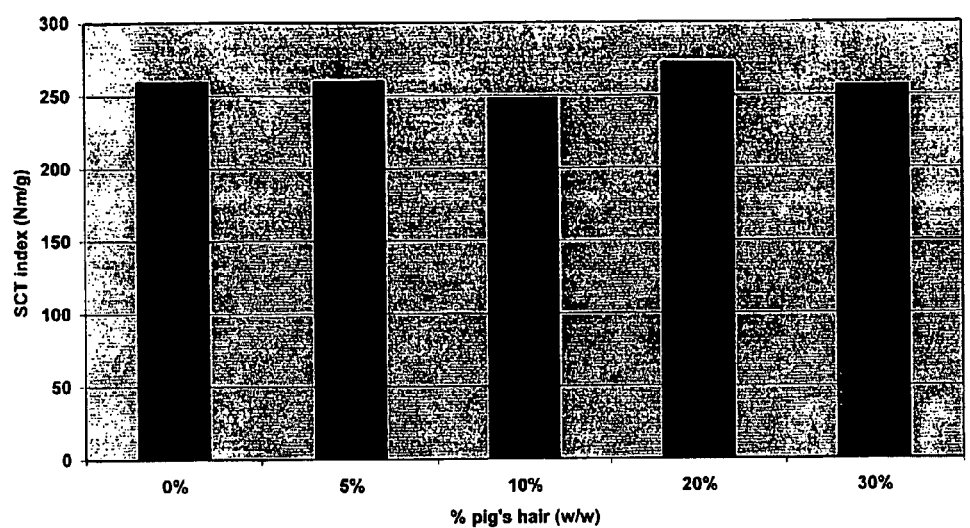
FIG. 2 is a graph showing the compression of five samples prepared according the Examples.

Short Compression Test:
The influence of oxidized and processed hair as additive in cellulose pulp on the SCT-Index is depicted in FIG. 2. As can be seen from FIG. 2 the SCT-Index properties of the sheets containing processed hair do not differ from the sheet containing only virgin cellulose fibres.

Figure 3:
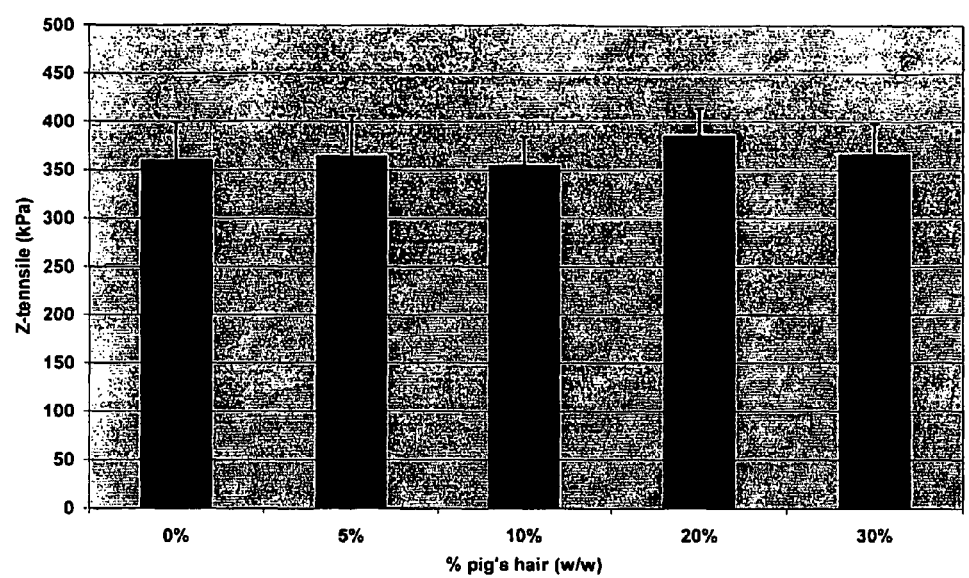
FIG. 3 is a graph showing the Z-directional tensile of five samples prepared according the Examples.

Z-directional Tensile:
The influence of bleached and processed hair on the Z-directional tensile is depicted in FIG. 3. FIG. 3 shows that also in this case the sheets containing bleached and processed hair fibres do not have an influence on the Z-directional tensile. The hair fibres seem to blend in with the cellulose fibres very well.

Figure 4:
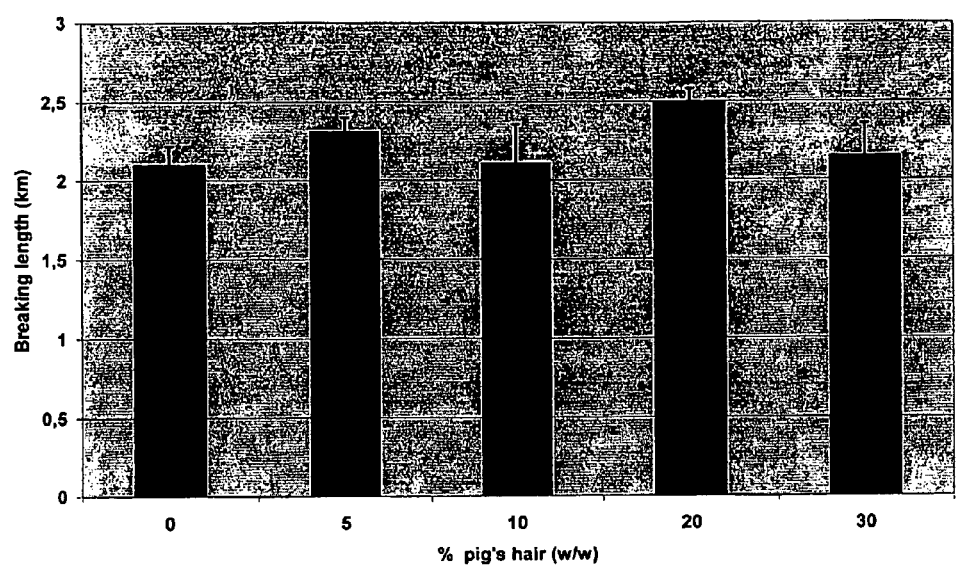
FIG. 4 is a graph showing the breaking length of five samples prepared according the Examples.

Tensile Index:
This parameter was measured to evaluate the force at break and gives an indication of the length of the paper needed before it breaks. FIG. 4 shows the results when part of the cellulose fiber was replaced by oxidized and processed hair fibres. FIG. 4 shows some variation in break length but the conclusion can be drawn that the sheets containing processed hair fibres do not have a negative influence on the performance.

Figure 5:
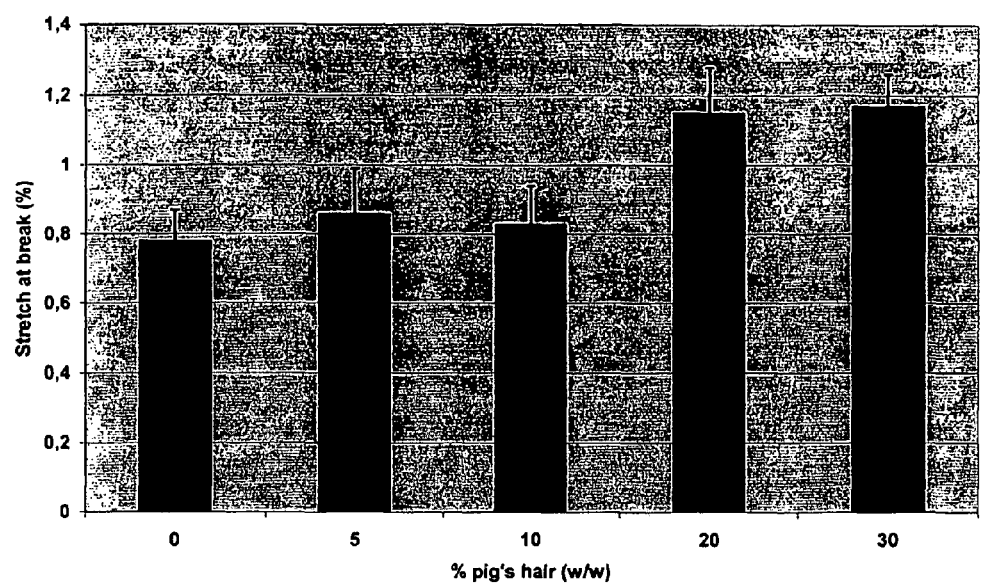
FIG. 5 is a graph showing the stretch at break of five samples prepared according the Examples.

Stretch at Break:
This parameter gives an indication of the amount of stretch of the paper sheet before it breaks. The results are depicted in FIG. 5. FIG. 5 shows that up to 10% replacement of cellulose fibres by oxidized and processed hair fibres do not give a significant difference in performance, while sheets containing 20 and 30% processed hair fiber do give a higher stretch at break.

The invention claimed is:

1. A method of preparing a particulate material derived from pigs to be used in the preparation of a paper or paperboard product, which particulate material is prepared by means of a process, which comprises the following steps:
    (a) subjecting pig hair to an oxidation treatment in which the hair is contacted with an alkaline solution having a pH value in the range of from 9 to 11, which comprises a bleaching agent, over a period of time ranging from 5 minutes to 16 hours;
    (b) separating the oxidised hair from the solution;

(c) drying the separated hair; and
(d) subjecting the dried hair to a treatment in which the hair is formed into a particulate material having an average particle length in the range of from 0.5 to 4 mm.

2. The method according to claim 1, wherein the particulate material has an average particle length in the range of from 1 to 3 mm.

3. The method according to claim 2, wherein the particulate material has an average particle length in the range of from 1.5 to 2.5 mm.

4. The method according to claim 1, wherein the bleaching agent is selected from the group consisting of hypohalides, perborates, percarbonates, organic peroxides, and hydrogen peroxide.

5. The method according to claim 4, wherein the bleaching agent comprises hydrogen peroxide.

6. The method according to claim 1, wherein the alkaline solution has a pH value in the range of from 10 to 11.

7. The method according to claim 1, wherein the treatment in step (d) is a refining treatment.

8. The method according to claim 1, wherein the hair is first subjected to a washing step in which soluble components are removed from the hair before the hair is subjected to step (a).

9. The method according to claim 1, wherein the particulate material comprises fibres.

10. A paper product comprising cellulose fibers mixed with the particulate material made by the process of claim 1.

11. A paperboard product comprising cellulose fibers mixed with the particulate material made by the process of claim 1.

12. Paper pulp comprising cellulose fibers mixed with the particulate material made by the process of claim 1.

13. A paper or paperboard product comprising cellulose fibers mixed with 20 to 30 wt. % of a particulate material derived from pig's hair, which particulate material is prepared by means of a process, which comprises the following steps:
(a) subjecting pig's hair to an oxidation treatment in which the hair is contacted with an alkaline solution having a pH value in the range of from 9 to 11, which comprises a bleaching agent over a period of time ranging from 5 minutes to 16 hours;
(b) separating the oxidised hair from the solution;
(c) drying the separated hair; and
(d) subjecting the dried hair to a treatment in which the hair is formed into a particulate material having an average particle length in the range of from 0.5 to 4 mm.

14. A method for preparing a paper or paperboard comprising
(a) subjecting pig's hair to an oxidation treatment in which the hair is contacted with an alkaline solution having a pH value in the range of from 9 to 11, which comprises a bleaching agent, over a period of time ranging from 5 minutes to 16 hours;
(b) separating the oxidized hair from the solution;
(c) drying the separated hair;
(d) subjecting the dried hair to a treatment in which the hair is formed into a particulate material having an average particle length in the range of from 0.5 to 4 mm; and
(e) mixing cellulose fibers with 20 to 30 wt. % of said particulate material based on the total paper or paperboard.

* * * * *